Oct. 18, 1966   L. H. FLORA   3,279,011
FASTENER DEVICE
Filed March 27, 1964   4 Sheets-Sheet 1

INVENTOR.
LAURENCE H. FLORA
BY *Teare, Fetzer & Teare*
ATTORNEYS

Oct. 18, 1966 L. H. FLORA 3,279,011
FASTENER DEVICE
Filed March 27, 1964 4 Sheets-Sheet 2

INVENTOR.
LAURENCE H. FLORA
BY *Teare, Fetzer & Teare*

ATTORNEYS

Oct. 18, 1966  L. H. FLORA  3,279,011
FASTENER DEVICE
Filed March 27, 1964  4 Sheets-Sheet 3

INVENTOR.
LAURENCE H. FLORA
BY *Teare, Fitzer & Teare*
ATTORNEYS

Oct. 18, 1966 L. H. FLORA 3,279,011
FASTENER DEVICE

Filed March 27, 1964 4 Sheets-Sheet 4

INVENTOR.
LAURENCE H. FLORA
BY
ATTORNEYS

United States Patent Office 3,279,011
Patented Oct. 18, 1966

3,279,011
FASTENER DEVICE
Laurence H. Flora, North Olmsted, Ohio, assignor to Tinnerman Products, Inc., Cleveland, Ohio, a corporation of Ohio
Filed Mar. 27, 1964, Ser. No. 355,211
10 Claims. (Cl. 24—73)

This invention relates to fastening devices and more particularly to an improved rotary, fractional turn fastener device for securement with an apertured member, such as a support panel or the like, and/or for securement of an object, such as molding, trim strips, wire, tubing or the like, to a support panel.

The fastening device of the present invention relates, though not exclusively, to a fastener construction for securement with an apertured support member, such as a support panel or the like, and to the improved construction of a fastener for securement of an object, such as a molding, trim strip or the like, to a support panel. Conventionally, it is known to effect such securement by the insertion of various types of fastening devices having retaining portions through respective openings in work or support panels. Upon insertion of the fastener through the panels, an object such as a molding, trim strip, or the like, is attached by means of engaging portions on the fastener to the respective panel. Many non-rotary as well as rotary type fastening devices have heretofore been known and for various applications, but such previously known devices have not readily lent themselves to mass production techniques; nor have such previously known devices provided structural characteristics to facilitate installation with and/or stability in securement of one or more component parts, particularly in the securement of molding, trim strips or the like to an apertured work or support panel. Furthermore, such previously known devices have not been effective in preventing the deleterious and/or corrosive effects on the component parts due to the entry of foreign materials, such as dust, dirt, water, moisture and the like, through cleavages or voids between the component parts resulting from heretofore known types of fastener securements.

Accordingly, it is an object of the present invention to provide an improved, comparatively small, light weight, rotary, fractional turn fastener which may be readily inserted through an apertured member, such as a support panel, and which may be firmly secured in position with the panel by rotary, fractional turning thereof for securement of an object, such as molding, trim strips or the like, to the panel.

Another object of the present invention is to provide an inexpensive, unitary, rotary, fractional turn fastener formed of polymeric material and having highly improved structural and resilient characteristics for the securement of one or more component parts together and which may be economically and easily produced by conventional molding and/or extruding techniques.

A further object of the present invention is to provide an improved rotary, fractional turn fastener of the type described for securing one or more component parts together, and which incorporates self-sealing characteristics for preventing the entry of foreign materials, such as dust, dirt, water, moisture and the like, between the component parts.

Other objects and advantages of the invention will be apparent from the following description taken in conjunction with the accompanying drawings, wherein.

Briefly, the present invention relates to an improved construction of what is hereinafter referred to as a rotary, fractional turn fastener. More particularly, when reference is made herein to a fractional turn fastener, it is intended to mean a fastener which may be rotated one-eighth of a turn; or which may be turned through an angle of approximately 45° on the basis of 360° to effect complete installation of the fastener. The fastener is preferably made from a resilient polymeric material which includes a flexible body having a preformed, generally nonplanar under surface and a depending shank and nose constructed for rotary, fractional turn installation with an apertured support panel. The body of the fastener includes outwardly and angularly extending wings which with the body provide a resilient construction that is progressively drawn into tight abutting engagement against the support panel upon rotary, fractional turn installation thereof. The body further includes resilient slotted shoulders constructed to provide for snap-fastening securement of a molding, trim strip or the like to the support panel, and which with the wings cooperate to support the molding in predetermined spaced relation from the support panel so as to allow the passage of moisture, water and the like between the support panel and the fastener in the installed position thereof. In addition, the shank and hose are constructed to provide deformable radii which cooperate with the apertured support panel to achieve self-sealing characteristics in the final installed position of the assembly.

Referring now again more particularly to FIGS. 1 to 6 of the drawings, the fastener, designated at 10, is preferably produced, such as by molding or extrusion, from a resilient polymeric material, such as nylon or the like. As shown, the fastener includes a main body 11 and a depending shank 12 and nose 13 constructed to provide rotary, fractional turn installation through an apertured support panel P (FIG. 7). The body 11 of the fastener is generally of an elongated construction and is preferably of a curved bow-like or of a generally concavo-convex, in elevation, shaped configuration (FIG. 2), and for the purposes as will hereinafter be more fully described.

Figure 1:
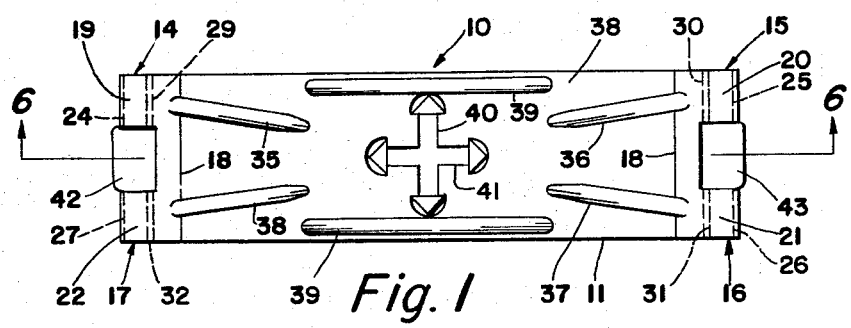
FIG. 1 is a top plan view on an enlarged scale of the improved rotary, fractional turn fastener of the present invention.
Figure 2:
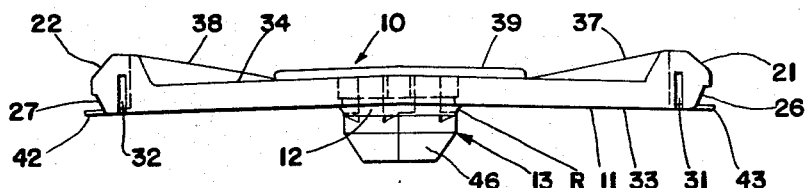
FIG. 2 is a side elevational view of the fastener of FIG. 1.
Figure 3:
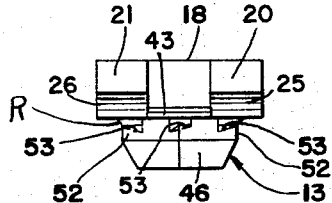
FIG. 3 is an end view of the fastener and looking from the right side of FIG. 2.
Figure 10:
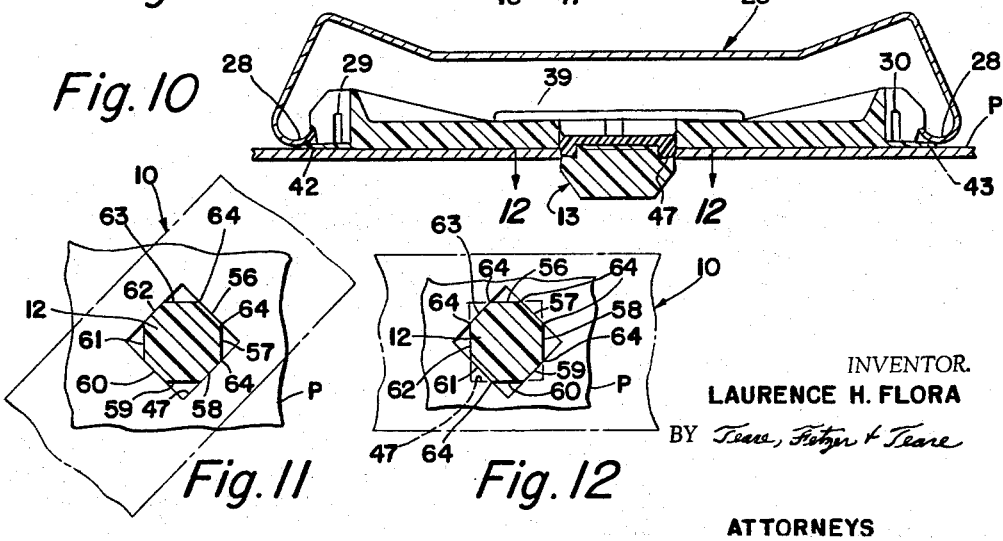
FIG. 10 is a sectional view on a slightly enlarged scale taken along line 10—10 of FIG. 8, and showing a molding or the like secured to the panel by means of the fastener of the present invention.

The opposed ends of the body 11 are each provided with a pair of spaced, upstanding resilient shoulders 14–17. Each pair of shoulders may be connected together by an integral bridging flange 18 extending transversely therebetween. As best illustrated in FIG. 3, each of the respective shoulders 14–17 approximates a generally hexagonal, in elevation, configuration which provides angularly extending cam-like surfaces 19–22 to facilitate snap-fastening engagement of an object 23, such as a hollow molding, to the support panel P, as shown in FIG. 10. The cam-like surfaces 19–22 of the respective shoulders are provided with undercut portions 24–27 which cooperate with the inturned portions 28 (FIG. 10) of the molding 23 to retain the latter in assembled position with the fastener. The shoulders 14–17 are each provided with transversely extending slots 29–32, which open onto the undersurface 33 of the fastener. The transverse slots 29–32 are preferably of a depth and thickness to provide maximum lateral resiliency in the shoulders 14–17 and to provide sufficient rigidity in the material to effectively retain the molding 23 in assembled relation with the panel P.

To strengthen the distal ends of the fastener 10, the body 11 may be provided on its uppersurface 34 and at each end thereof, with a pair of spaced, generally upstanding tapered webs 35–38. The webs are also made integral with and taper convergently downwardly from the respective shoulders 14–17 to smoothly merge with the upper surface 34 of the body 11. To strengthen the central portion of the fastener, the body 11 may be provided with a pair of spaced, parallel ribs 39 disposed adjacent the opposed marginal edges thereof.

To effect rotary, fractional turn installation of the fastener 10, a pair of crossed slots 40, 41 may be provided centrally of the body 11 and generally intermediate the spaced ribs 39. Moreover, a suitable tool, such as a screw driver or the like, may be readily inserted into the crossed slots 40, 41 for the purpose of applying turning pressure to the fastener.

Figure 5:
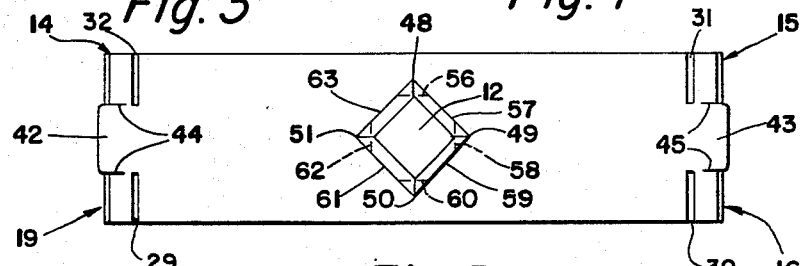
FIG. 5 is a bottom view of the fastener and looking from the bottom of FIG. 2.

As is best illustrated in FIGS. 1, 2, 5 and 6, the fastener 10 is provided on its undersurface 33 and adjacent the opposed distal ends thereof, with outwardly and angularly extending resilient wings 42, 43. The resilient wings 42, 43 are preferably made integral with and form extensions of the curved bow-like undersurface 33 of the fastener. Such resilient wing construction greatly enhances the resilient characteristics of the body 11 of the fastener, and acts to provide retainer-like shelves which cooperate with the resilient shoulders 14–17 to support the inturned edges 28 of the molding 23 in predetermined spaced relation from the support panel P. As best illustrated in FIG. 5, the wings 42, 43 are of a lesser transverse width as compared to that of the body 11 of the fastener, but are of a width to be disposed between and made integral with the spaced shoulders 14–17, as at 44 and 45. This arrangement provides maximum resilient characteristics in the curved bow-like body 11 of the fastener without impairing the resilient characteristics in the shoulders 14–17 to achieve the aforementioned securement of a molding 23 to the panel P.

Figure 6:
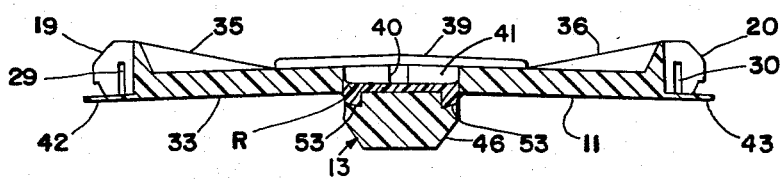
FIG. 6 is a sectional view of the fastener of FIG. 1, taken on the line 6—6 of FIG. 1.
Figure 7:
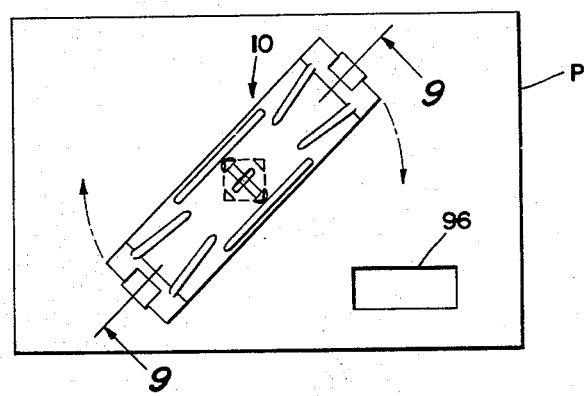
FIG. 7 is a top plan view of the fastener of FIG. 1 shown in assembled position with an apertured panel and prior to rotary orientation of the fastener into secured position with the panel.
Figure 8:
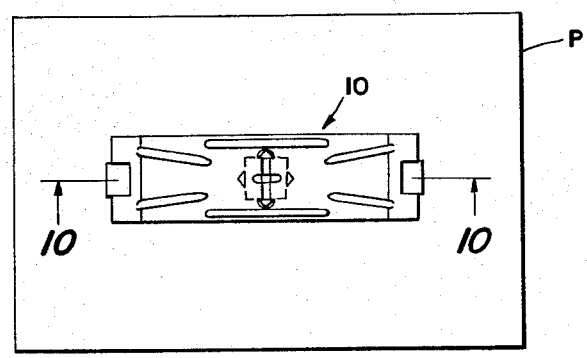
FIG. 8 is a top plan view of the fastener of FIG. 1 and showing the fastener in its rotary oriented position and turned through an angle of approximately 45° for interlocking securement with the panel.

As shown in FIG. 6, the wings 42, 43 are of a thickness sufficient to space the molding 23 from the panel P, thereby to provide for the free passage of water, moisture, or the like between the fastener and the panel. Preferably, to the accomplishment of this purpose, the wings 42, 43 are of approximately 0.012 inch in thickness, with a tolerance of plus or minus 0.002 inch. Moreover, it can be seen by this arrangement there is no opportunity for water, moisture or the like to accumulate between the fastener body 11 and the panel P. This results in a substantial reduction in corrosion between the component parts.

Figure 9:
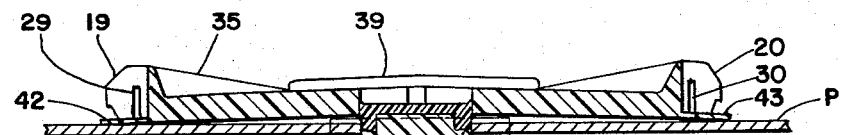
FIG. 9 is a sectional view on an enlarged scale taken along the line 9—9 of FIG. 7.

As shown in FIG. 5, the nose 13 is preferably square in cross section and includes a generally inverted truncated head portion 46 having tapered side surfaces to facilitate rotary insertion through the apertured panel P. The nose 13 is preferably of a slightly smaller cross-sectional dimension than that of the opening 47 (FIG. 9) through the panel P when, for instance, the opening is generally square shaped. Thus, by insertion of the nose 13 through the panel opening 47 and by turning the fastener through an angle of approximately 45°, the four proximal corners 48–51 thereof are brought to overlie the confronting marginal edges presented by the opening 47.

Figure 4:
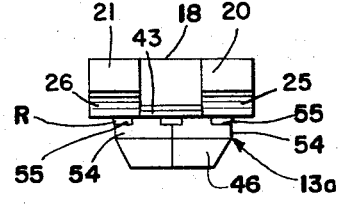
FIG. 4 is an end view of the fastener but showing a modified construction of the nose of FIG. 3.

As best shown in FIG. 3, the nose 13 of the fastener further includes leading or cam-like ledge portions 52 extending from each of the proximal corners 48–51 thereof. As shown, each ledge portion 52 includes a leading or cam-like surface 53 (FIG. 6), which tapers generally in the direction of rotation of the fastener to facilitate rotary installation thereof, and to provide a firm gripping engagement with the confronting marginal surfaces of the opening 47 in the panel P. Though a highly improved rotary and gripping action can be achieved with the four ledge 52 construction shown, it is to be understood that satisfactory results can also be achieved by any other number and/or arrangement of the ledge construction. In FIG. 4, for instance, a modified fastener nose 13a is shown absent the leading ledge construction. Specifically, in this form the nose 13a may be provided with undercut shoulder portions 54 which define flat or planar cam-like surfaces 55 to facilitate firm engagement with the confronting marginal surfaces of the panel opening.

Figures 11, 12:
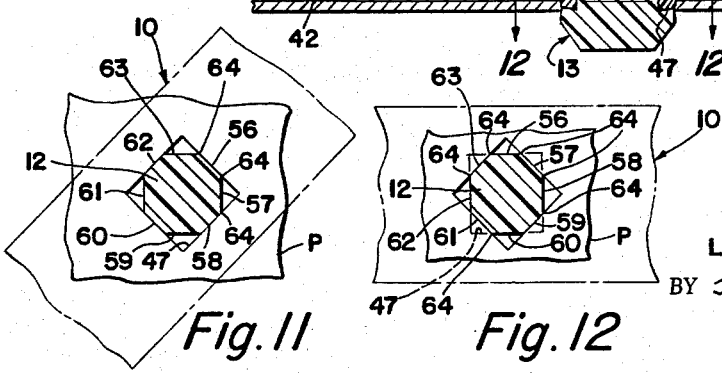
FIG. 11 is a sectional view taken along the line 11—11 of FIG. 9.
FIG. 12 is a sectional view taken along line 12—12 of FIG. 10.
Figure 13:
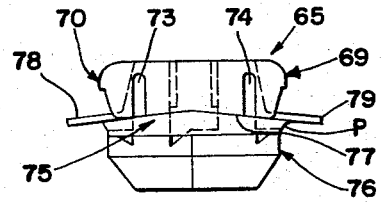
FIG. 13 is a side elevational view showing a modified form of the improved rotary, fractional turn fastener of the present invention.
Figure 14:
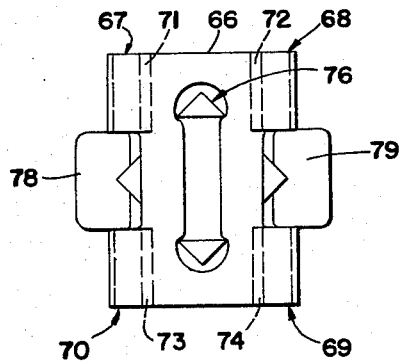
FIG. 14 is a top plan view of the fastener of FIG. 13.
Figure 15:
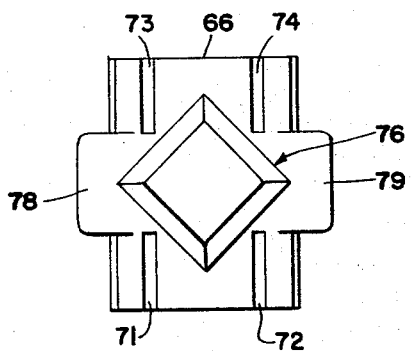
FIG. 15 is a bottom view of the fastener and looking from the bottom of FIG. 13.
Figure 16:
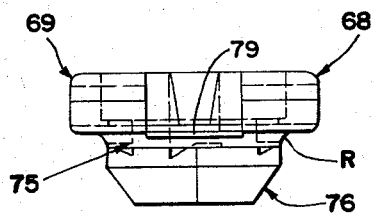
FIG. 16 is an end view of the fastener and looking from the right side of FIG. 13.

The depending shank 12 connecting the nose 13 to the body 11 of the fastener is preferably polygonal shaped in cross-section. As best shown in FIGS. 5, 11 and 12, the shank 12 is preferably octagonal in cross-section, defining eight sides 56–63. As shown, the shank is preferably oriented in relation to the nose 13 so that four of the opposed flat sides (57, 59, 61 and 63) of the shank 12 are coextensive in cross-sectional dimension with, or lie in the same vertical plane as, the four corresponding flat sides of the square shaped fastener nose 13. Accordingly, it can be seen that the cross-sectional dimension of the shank 12, across the sides 57, 59, 61, 63, is approximately the same as the corresponding cross-sectional dimension of the nose 13, and with this dimension being slightly smaller than that of the corresponding dimension of the square shaped opening 47 in the panel P. Thus, upon insertion of the nose 13 through the opening 47, at least one flat side of the shank, namely one of the sides 56, 58, 60 and 62, will be in surface-to-surface engagement with the confronting marginal edge of the opening 47 through the panel P (FIG. 11); and after rotary, fractional turning of the fastener through an angle of approximately 45°, at least one of the other flat sides, namely one of the sides 57, 59, 61, and 63, will be in surface-to-surface contact with the confronting marginal edge of the opening 47 (FIG. 12) to provide a firm interlocking engagement with the panel P in the assembled position of the fastener.

It is to be further noted that another important advantage of the aforementioned resilient polymeric polygonal construction of the depending shank 12, is the provision of severable edge portions 64 which are integral with the shank 12 (FIGS. 11 and 12). Hence, by turning the greater dimension of the shank 12 transversely of the panel opening 47 there is provided a firm coacting engagement with the confronting marginal edges presented by the opening 47, due to the edges cutting into the severable edge portions 64 of the shank 12 as the fastener is turned through an angle of approximately 45° into its assembled position.

To further facilitate rotary, fractional turn installation and to incorporate self-sealing characteristics in the assembled position of the fastener 10, the nose 13 is preferably provided with radii R comprised of deformable material, such as beeswax or the like. As illustrated in FIG. 3, the deformable radii R may be applied, such as by hand or by other suitable means as known in the art, to the space between the ledge portions 52 of the nose 13 and the confronting undersurface 33 of the body 11 of the fastener. Similarly, in the modified nose 13a construction of FIG. 4, the deformable radii R may be applied in the same manner and between the shoulders 54 and the undersurface 33 of the body 11 on the fastener. The radii R being readily deformable act as a lubricant during rotary installation of the fastener, and, being highly impervious to the passage of fluid, provides an effective seal against the entry of foreign materials, such as dust, dirt, moisture, water and the like, between the shank 12 and the confronting marginal edges presented by the panel openings 47.

In applying the fastener 10 to the support panel P, the depending nose 13 is passed through the panel opening 47 wherein the body 11 of the fastener will be disposed somewhat diagonally relative to the panel P, as shown in FIG. 7. Before the nose 13 has completely passed through the opening, the distal ends of the wings 42, 43 will be brought into engagement against the confronting side of the panel P to limit further axial movement of the fastener. In this initially installed position, the body 11 of the fastener is disposed in its curved bow-like condition and in a predetermined spaced relationship relative to the confronting side of the panel P. Upon application of pressure by means of the fingers or a suitable tool, the nose 13 is moved axially through the opening 47 and simultaneously rotated in a clockwise direction, as shown by the arrows, until the leading or cam-like surfaces 53 of the ledge portions 52 engageably grip the other confronting side of the panel P. Continued rotary movement of the fastener progressively draws the curved bow-like body 11 and wing portions 42, 43 into tight abutting engagement with one side of the panel P (FIG. 10) and brings the ledge portions 52 into overlying engagement with the other side of the panel P. As the fastener approaches the 45° rotary, fractional installed position, the confronting marginal edges presented by the panel opening 47 cut into the severable edge portions 64 of the shank 12 to provide a firm surface-to-surface engagement between the flat sides 57, 59, 61 and 63 of the shank 12 and the corresponding marginal edges of the panel opening 47 in the final assembled position of the fastener (FIG. 12).

In this final installed position, a conventional molding 23 may then be applied to the fastener by snapping the inturned edges 28 of the molding 23 down over the cam surfaces 19–22 of the shoulders 14–17 until the inturned edges 28 are engageably retained by the undercut recessed portions 24–27. In this position, the inturned edges 28 of the molding 23 are supported in a predetermined spaced relation from the upper surface of the panel P and on the outwardly extending and now planar wings 42, 43 (FIG. 10) so as to provide for the free passage of moisture, water and the like between the panel P and the fastener 10.

Figure 17:
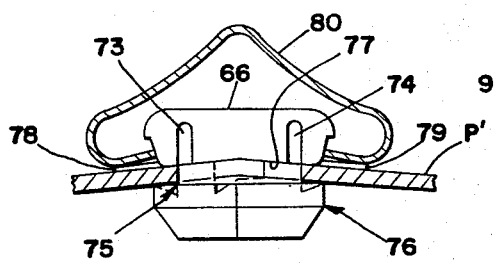
FIG. 17 is a side elevational view of the modified form of the fastener of FIGS. 13 to 17 assembled with a panel, partly in section, with a molding or the like secured by means of the fastener to the panel.
Figure 18:
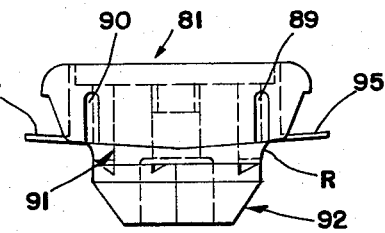
FIG. 18 is a side elevational view showing another modified form of the improved rotary, fractional turn fastener of the present invention.
Figure 19:
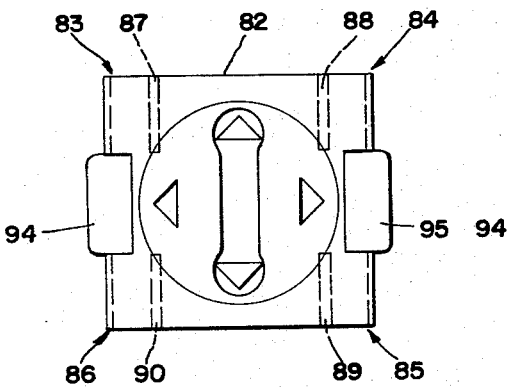
FIG. 19 is a top plan view of the fastener of FIG. 18.
Figure 20:
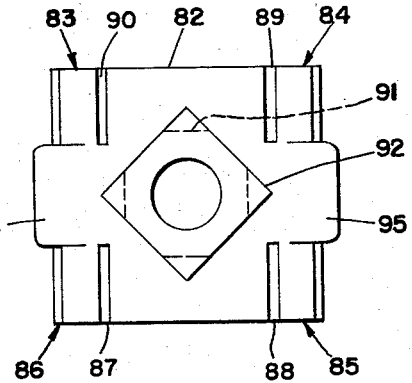
FIG. 20 is a bottom view of the fastener and looking from the bottom of FIG. 18.
Figure 21:
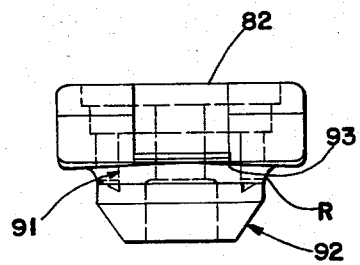
FIG. 21 is an end view of the fastener and looking from the right side of FIG. 18.

The fastener 65 illustrated in FIGS. 13 to 17, inclusive, is of the same general type as that illustrated in FIGS. 1 to 12, inclusive, except that in this form the fastener is particularly useful when applied to generally arched, in elevation, support panels P', as shown in FIG. 17. In the form shown, the fastener 65 includes a generally elongated body 66 having a pair of spaced shoulders 67–70 disposed at each of the opposed distal ends of the fastener, which are provided with transverse slots 71–74 to enhance the lateral resilient characteristics adjacent the ends of the fastener. The fastener 65 is provided with the aforementioned depending shank 75 and nose 76 construction adapted to be inserted through an opening in the support panel P'. In this form, however, the undersurface 77 of the body 66 of the fastener is generally of an upwardly arched, in elevation, configuration as opposed to the curved bow-like configuration of the body aforementioned in connection with FIGS. 1 to 12, inclusive. Moreover, in this form, the wings 78 and 79 extend outwardly and angularly downwardly intermediate the spaced shoulders 67–70 to form generally planar extensions of the upwardly arched undersurface 77 of the body 66 of the fastener. Hence, upon application of the fastener 65 to the upwardly arched panel P', as shown in FIG. 17, the body 66 of the fastener is progressively drawn into tight abutting engagement against the confronting side of the panel P' as the fastener is rotated through approximately 45°, after which and in the final position of the fastener, the undersurface 77 of the body 66 is brought to assume the same general contour as that presented by the panel P'. In this form, due to the shorter length of the fastener 65, as compared to that of FIGS. 1 to 12, inclusive, it can be seen that the transverse slotted construction 71–74 of the shoulders 67–70 greatly enhances the resilient characteristics of the body 66 of the fastener, enabling it to readily assume the desired panel contour. The application of the molding 80 to the panel P' is substantially the same as that aforementioned in connection with FIG. 10 of the drawings.

Figure 22:
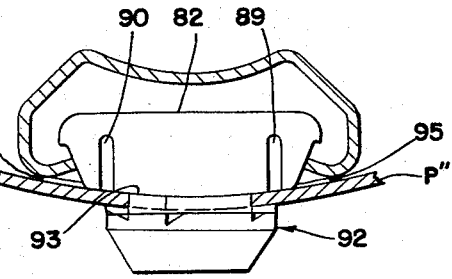
FIG. 22 is a side elevational view of the modified form of the fastener of FIGS. 18 to 21 assembled with a panel, partly in section, with a molding or the like secured to a panel by means of the fastener.

The fastener 81 illustrated in FIGS. 18 to 22, inclusive of the drawings is generally of the same type as that illustrated in FIGS. 13 to 17, inclusive, except that in this form the fastener is highly advantageous when applied to an upwardly curved or bowed support panel P'', as shown in FIG. 22. Similarly, in this form, the fastener 81 includes a body 82 of a generally square-shaped configuration having a pair of spaced shoulders 83–86 disposed at each of the opposed distal ends thereof, with transverse slots 87–90 formed therein to enhance the resilient characteristics of the fastener. Here again, the fastener 81 is provided with the aforementioned depending shank 91 and nose 92 construction for rotary, fractional turn installation of the fastener through the apertured support panel P''. However, in this form, the underside of the body 82 of the fastener is provided with a downwardly or oppositely arched undersurface 93 compared to the upwardly arched undersurface 77 construction of FIGS. 13 to 17. Moreover, in this form the wings 94 and 95 extend outwardly and angularly upwardly intermediate the spaced shoulders 83–86 to form resilient extensions of the undersurface 93 of the body 82 of the fastener. Hence, upon application of this form of the fastener, the upwardly arched undersurface 93 of the fastener is drawn progressively downwardly into tight abutting engagement with the confronting bowed surface of the panel P'' as the fastener is rotated through an angle of approximately 45°, after which and in the final position of the fastener, the undersurface 93 thereof is brought to assume substantially the same curved contour of the panel P''. Here too, it may be noted that the transverse slotted construction 87–90 of the spaced shoulders 83–86 greatly enhances the resilient characteristics of the body 82 of the fastener, particularly when applied to such curved, in contour, support panels.

From the foregoing description and accompanying drawings, it is apparent that the rotary, fractional turn fastener of the present invention provides many important advantages over heretofore known types of fastener devices for securing various objects, such as molding, trim strips, wire, tubing and the like, to an apertured support panel. Thus, while the fastener in a preferred form, has been illustrated as being made from a resilient polymeric material, such as nylon, it is to be understood that other similar types of resilient polymeric materials may also be utilized to achieve equally beneficial results. In some instances, it is preferred that the polymeric material be impregnated with a particulate or fibrous material, such as glass, glass wool, or the like, to enhance the strength of the material and to heighten the appearance of the fastener. Also, though the opening through the support panel, in a preferred form, has been illustrated as square-shaped, it is to be understood that other similar polygonal shaped openings, such as the rectangular opening 96 illustrated in FIG. 7, may be utilized in accordance with the principles of the present invention.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. A rotary, fractional turn fastening device made from polymeric material adapted for insertion through a polygonal opening in a support member comprising, a head-like body adapted to be disposed adjacent one side of said support member, a polygonal nose having a plurality of generally flat side surfaces adapted to be disposed through the aperture in said support member, a polygonal shank having a plurality of generally flat side surfaces integrally connecting said body to said nose and adapted to be disposed within the aperture in said support member, said shank having a greater number of side surfaces as compared to the number of side surfaces on said nose, certain of the side surfaces on said shank being substantially co-planar with the side surfaces on said nose for insertion therewith through the aperture in said support member, the other side surfaces of said shank being angularly disposed relative to the side surfaces of said nose to provide shoulder portions extending outwardly therefrom by an amount sufficient to overlie the marginal edges presented by the aperture in said support member in the rotary installed position thereof, and the corners defined by the side surfaces of said shank providing severable edge portions extending between said body and said nose adapted to be severed by the marginal edges of the aperture in said support member upon rotary movement of said device relative to said support member.

2. A rotary, fractional turn fastening device in accordance with claim 1, wherein said shoulder portions include tapered surfaces extending angularly in the general direction of rotation of said device relative to said support member.

3. A rotary, fractional turn fastening device in accordance with claim 1, wherein the bottom surface of said body is generally of a curved arcuate configuration, and wherein said shoulder portions include tapered surfaces extending angularly in the general direction of rotation of said device for progressively drawing the body of said device into tight abutting engagement with the confronting side of said support member.

4. A rotary, fractional turn fastening device in accordance with claim 1, including a deformable, polymeric material disposed on said shank between said body and said shoulder portions, said deformable material being substantially softer than the material of said device to provide a lubricant for and a seal between said shank and the marginal edges presented by the aperture in said support member.

5. A rotary, fractional turn fastening device in accordance with claim 1, including a pair of laterally spaced shoulders integral with and disposed adjacent the opposed ends of said body, each of said shoulders having a transverse slot extending partially upwardly therethrough and having exterior cam-like surfaces thereon for snap-fastening resilient engagement with an object, such as a molding, adapted to be mounted on said support member, and a relatively thin flexible wing extending outwardly between each of said pairs of shoulders, said wings being made integral with and forming an extension of the bottom surface of said body adapted to resiliently cooperate with the confronting one side of said support member so as to support the molding in predetermined spaced relation from said support member.

6. A rotary, fractional turn fastening device in accordance with claim 1, wherein said shank is generally octagonal in cross-section, and wherein said nose is generally square in cross-section.

7. A rotary, fractional turn fastening device in accordance with claim 1, wherein the maximum transverse dimension between the oppositely disposed and co-planar sides of said shank and nose is slightly smaller than the maximum transverse dimension of the aperture in said support member.

8. A rotary, fractional turn fastening device in accordance with claim 1, wherein the maximum transverse dimension between diagonally opposed of the severable edge portions of said shank is slightly greater than the maximum transverse dimension of the aperture in said support member.

9. A rotary, fractional turn fastening device in accordance with claim 1, wherein the bottom surface of said body is of a generally inverted V-shaped configuration.

10. A rotary, fractional turn fastening device in accordance with claim 1, wherein the bottom surface of said body is of a generally V-shaped configuration.

References Cited by the Examiner

UNITED STATES PATENTS

| D. 32,958 | 7/1900 | Graham | 85—21 X |
|---|---|---|---|
| 364,779 | 6/1887 | Seymour | 85—22 |
| 2,826,388 | 3/1958 | Janos et al. | 85—5 X |
| 2,940,558 | 6/1960 | Schlueter | 85—82 X |
| 3,020,611 | 2/1962 | Perrochat. | |
| 3,116,526 | 1/1964 | Cochran. | |
| 3,127,965 | 4/1964 | Weisenberger. | |

WILLIAM FELDMAN, *Primary Examiner.*

E. SIMONSEN, *Assistant Examiner.*